United States Patent

[11] 3,627,002

[72] Inventor Oscar T. Fulghum, Jr.
Wadley, Ga.
[21] Appl. No. 64,149
[22] Filed Aug. 3, 1970
[45] Patented Dec. 14, 1971
[73] Assignee Fulghum Enterprises, Inc.
Wadley, Ga.

[54] TIMBER SHEAR CONSTRUCTIONS
21 Claims, 8 Drawing Figs.
[52] U.S. Cl. .................................................... 144/34 E,
144/3 D
[51] Int. Cl. ................................................................ A01g 23/02
[50] Field of Search ............................................ 144/2 Z, 3
D, 34 R, 34 E, 309 AC

[56] References Cited
UNITED STATES PATENTS
3,382,899 5/1968 White ........................... 144/34 E
3,482,613 12/1969 Jordan .......................... 144/34 E
3,482,614 12/1969 Jordan et al. ................. 144/34 E
3,528,468 9/1970 Blonsky ........................ 144/309 AC
3,529,641 9/1970 Frankenberg et al. ........ 144/34 E Primary Examiner—Gerald A. Dost
Attorney—Cushman, Darby & Cushman ABSTRACT: An improved shear construction is provided for cutting and felling trees and for maintaining a shear in tight engagement with a tree while a cutting operation is taking place. The shear is of a type having a pivotally mounted blade. An improved mounting arrangement for the blade provides a pair of bearing plate elements for supporting and mounting a cutting blade for pivotal movement about an offset axis relative to a jaw carried by the main body of the shear. The main body of the shear includes a jaw towards which a cutting edge of the cutting blade may advance for effecting a cutting action. The jaw may be provided with an anvil, or alternatively, may be constructed to permit an unobstructed passage of chips, bark and other debris through the jaw as a cutting action is taking place. The cutting blade is operated by a hydraulic cylinder, and the entire shear may be mounted on a vehicle. The main body of the shear may be constructed from a pair of spaced plate members which receive and support a base end of the cutting blade means, and a tree pushing and handling element may be provided adjacent to the jaw of the main body for lifting the butt end of a log after it is cut and for pushing the log by forward movement of a vehicle which carries the shear. The cutting blade means may be provided with a cutting edge which is either plain or serrated. Cutting teeth of the serrated embodiment of a cutting blade means are formed with leading edges which function as cutting edges and with trailing edges which do not cut so that a tree is retained within the confines of the shear while a cutting operation is taking place.

Patented Dec. 14, 1971 3,627,002

INVENTOR
Oscar T. Fulghum, Jr.

BY Cushman, Darby & Cushman
ATTORNEYS

Patented Dec. 14, 1971
3,627,002
3 Sheets-Sheet 2
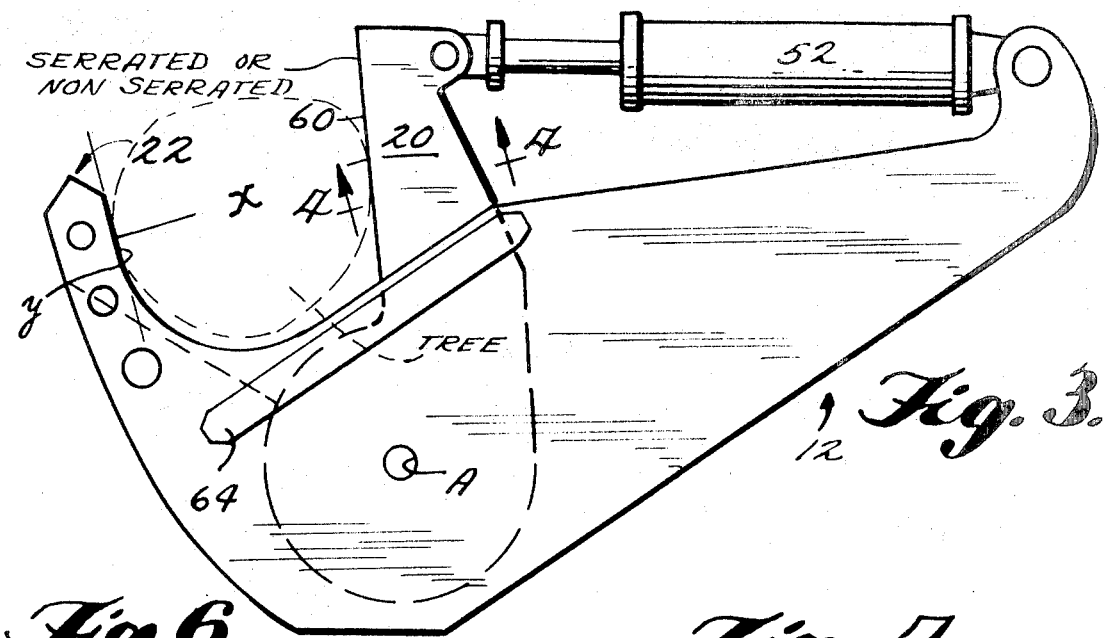
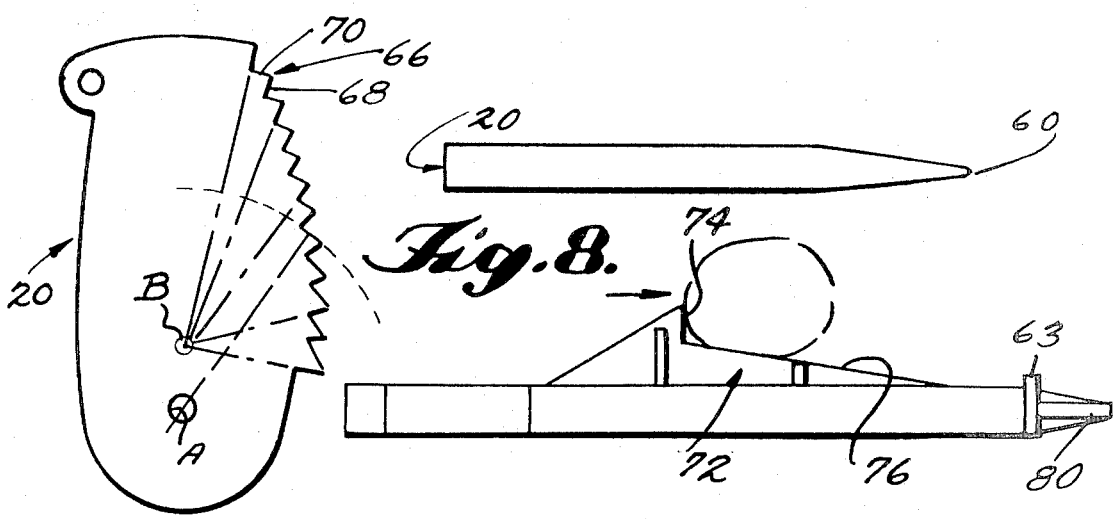
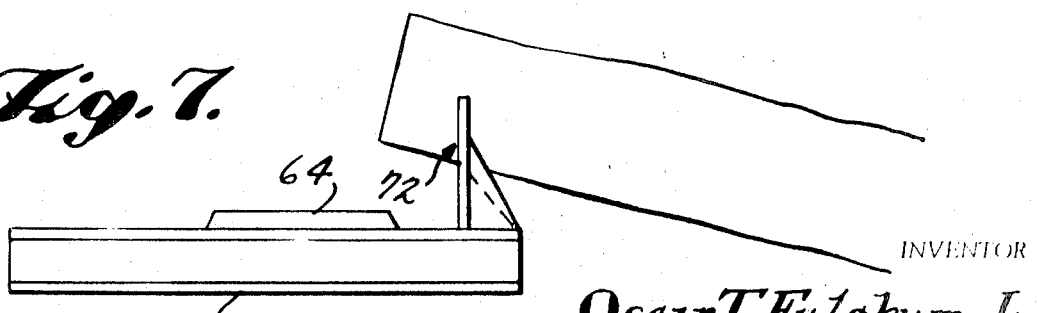
INVENTOR
Oscar T. Fulghum, Jr.
BY Cushman, Darby & Cushman
ATTORNEYS Patented Dec. 14, 1971

INVENTOR
Oscar T. Fulghum, Jr.

BY Cushman, Darby & Cushman
ATTORNEYS

TIMBER SHEAR CONSTRUCTIONS

This application is a streamlined continuation of application Ser. No. 728,489, filed May 5, 1968, and now abandoned.

BACKGROUND AND BRIEF DESCRIPTION OF INVENTION

This invention related to improvements in shear devices of the type which are useful for cutting trees. In particular, the invention provides improvements for timber shears having cutting blades which are pivotally mounted so that they can be advanced and withdrawn towards and away from a tree about a pivotal axis. A jaw member cooperates with such shears to bear against one side of a tree while the cutting blades being advanced through the tree from an opposite side.

It is known in the prior art to provide various constructions and configurations for shears which will cut trees. For example, it is known to provide for timber shear constructions having opposed blades which operate in a scissorlike fashion. Shears have been provided with blades which reciprocate back and forth in a straight line of movement, and shears have been constructed with blades which move in an arc about a pivotal axis to effect a cutting of a tree. Prior U.S. Patents which are representative of the various forms of shear constructions include U.S. Pat. Nos. 2,751,943, 2,845,101, 2,955,631, 3,122,184, 3,183,954, 3,196,911, 3,269,437, 3,270,787, and 3,327,745.

The present invention is concerned with improvements in timber shears of the type having a main body portion for carrying a pivotally mounted cutting blade means which can be advanced and withdrawn about a pivotal axis towards and away from a jaw member carrier by the main body of the shear. Shears of this type offer certain advantages in cost of production and in efficiency of operation for cutting relatively large timer. However, certain problems have arisen with respect to the capability of such shears for handling very large timber and hardwoods, and the present invention provides for an improved shear having characteristics which contribute to a stronger and longer wearing device which is capable of cutting large timber efficiently. The timber shear of this invention is especially useful when mounted on a vehicle, and shear is constructed to eliminate any reaction forces against the vehicle while a cutting operation is taking place. In contrast, certain prior art constructions have placed considerable reaction forces on vehicles, and it has been a prior art practice to provide brakes, anchors and other devices to maintain a shear and a vehicle in contact with a tree. In accordance with further teachings of the present invention, a timber shear is provided with an improved mounting arrangement for its cutting blade, an improved jaw and cutting blade combined configuration for retaining a tree within the confines of the shear while a tree is being cut, and improved devices combined with the shear for assisting in a safe handling and control of trees while they are being cut and after they are cut.

The main body of the shear of this invention may be made from two plate members spaced from one another to define a recess for receiving a base end of a cutting blade means and for defining a jaw portion which can cooperate with the cutting blade means to effect a cutting of a tree. The main body of the shear can be mounted to a vehicle so that the entire shear can be lifted and lowered or tilted, as may be required in actual use. The cutting blade means for the shear is of a type which is mounted for pivotal movement back and forth towards and away from a jaw portion of the main body of the shear. A base portion of the cutting blade means is mounted within a recess of the main body for pivotal movement, and a cutting portion of the blade extends outwardly from the main body for contacting and cutting a tree. The cutting blade means is operated by a double-acting hydraulic cylinder which is controlled in any well-known manner.

One of the features of the present invention provides for an improved mounting of the pivotal cutting blade means relative to the main body of the shear. The improved mounting arrangement includes two bearing plates positioned on opposite flat surfaces of the base portion of the cutting blade means so as to fully support the entire base of the blade without a requirement for any additional bearing blocks in the shear constructions. Each bearing plate means is preferably circular in its outer configuration, and each bearing plate has a concentric opening through its center so that a pair of bearing plates can be positioned to completely surround the pivotal axis of the cutting blade means. The improved mounting arrangement provides for a firmer, longer wearing arrangement than has been available with prior constructions, and the circular bearing plates may be rotated and repositioned from time to time to compensate for wear, if necessary. The cutting blade means also may include a feature of a particular positioning of its pivotal axis relative to the jaw of the shear, and the cutting edge itself may be provided with teeth which are constructed to cut on a forward stroke of the blade towards the jaw portion of the shear. The shear is of a novel construction which causes the shear to embrace and retain a tree once a cutting operation has started so that no reaction forces are applied to the shear or to the vehicle upon which it is mounted. In one embodiment of the invention, reaction forces are eliminated by a particular configuration of teeth of the cutting portion of the shear blade, and in another embodiment reaction forces are eliminated by a particular relationship of the shear jaw to a tree and to the cutting blade once a cutting operation has started. Features of the two embodiments may be combined in a single shear constructions, if desired.

The jaw portion of the shear may include an anvil against which a tree is pressed while it is being cut, or alternatively, the jaw portion may be constructed to have a hollow passage therethrough which is completely unobstructed so that chips, bark and other debris can be pushed through the jaw as a cutting action takes place. A tree pushing and handling element may be carried adjacent to the jaw portion of the shear for lifting the butt end of a tree while it is falling and for holding the butt end in an elevated position after it is completely severed from its stump. In this sense, the tree pushing and handling element acts as a fulcrum to raise the butt end of a cut tree into a position where it can be further handled and pushed. The tree pushing and handling element includes a vertical portion which functions to push trees, once they have been cut, if the operator of a vehicle carrying the improved shear desires to move trees to preferred locations or positions.

These and other features and advantages of the present invention will become more apparent in the detailed discussion which follows. In the detailed discussion reference will be made to the accompanying drawings described below:

BRIEF DESCRIPTION OF DRAWINGS

FIG. 3 is a top plan view of the type of shear shown in FIG. 1;

FIG. 4 is a cross-sectional view of a cutting blade means as seen on lines 4—4 of FIGS. 3 and 5;

FIG. 6 is a top plane view of a cutting blade means of the type shown in FIG. 5;

FIG. 7 is an elevational view taken on lines 7—7 of FIG. 5 to illustrate one function of a tree pushing and handling element carried by the shear; and FIG. 8 is an elevational view taken on lines 8—8 of FIG. 5 to illustrate a second function of the tree pushing and felling element shown in FIGS. 6 and 7.

DETAILED DESCRIPTION OF INVENTION

Figures 1, 2:
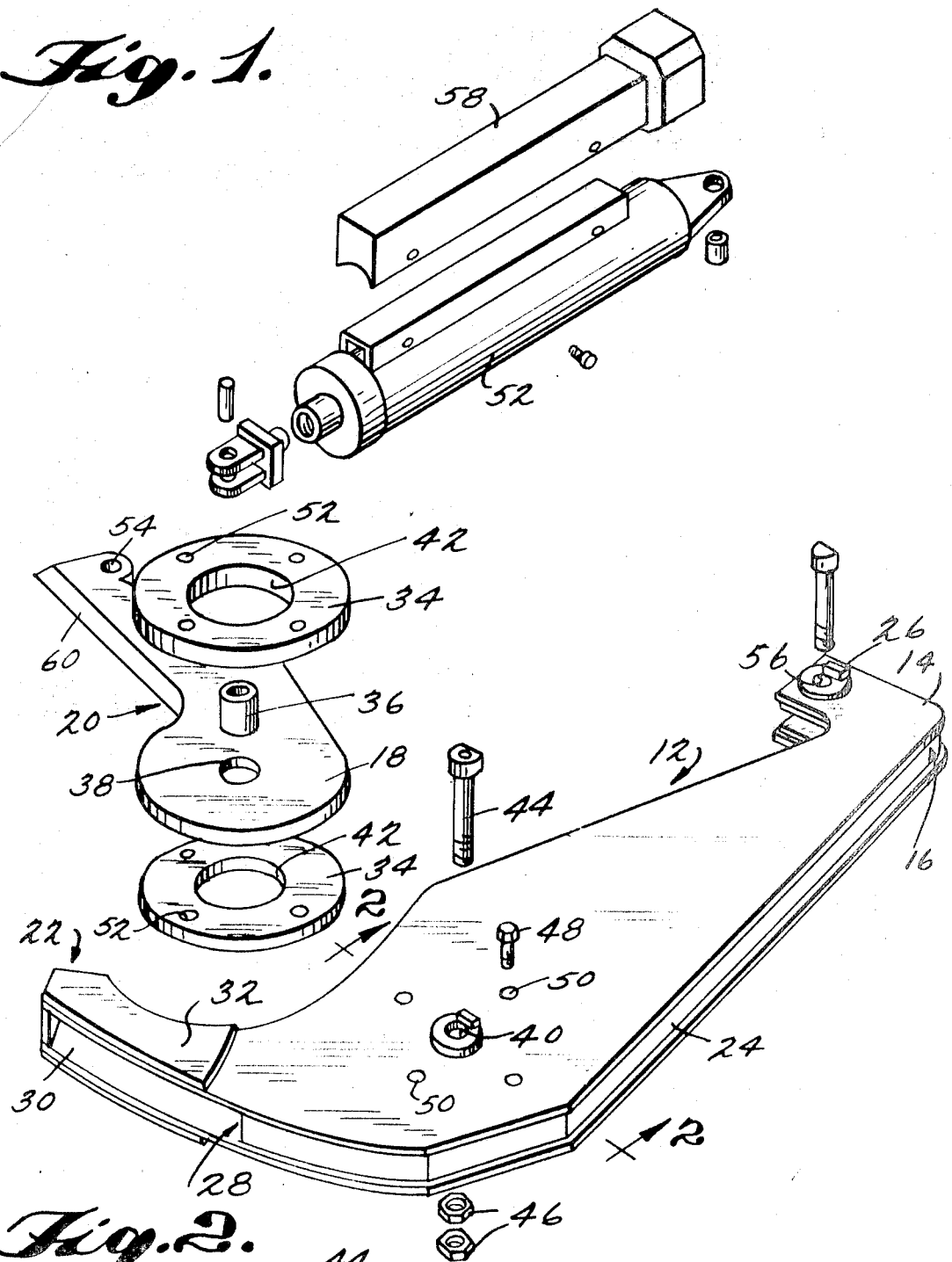
FIG. 1 is an exploded perspective view of one embodiment of timber shear in accordance with this invention, showing an improved blade mounting arrangement and an improved blade and jaw construction.
FIG. 2 is a cross-sectional view of an assembly of FIG. 1, as seen on line 2—2 of FIG. 1.
Figure 5:
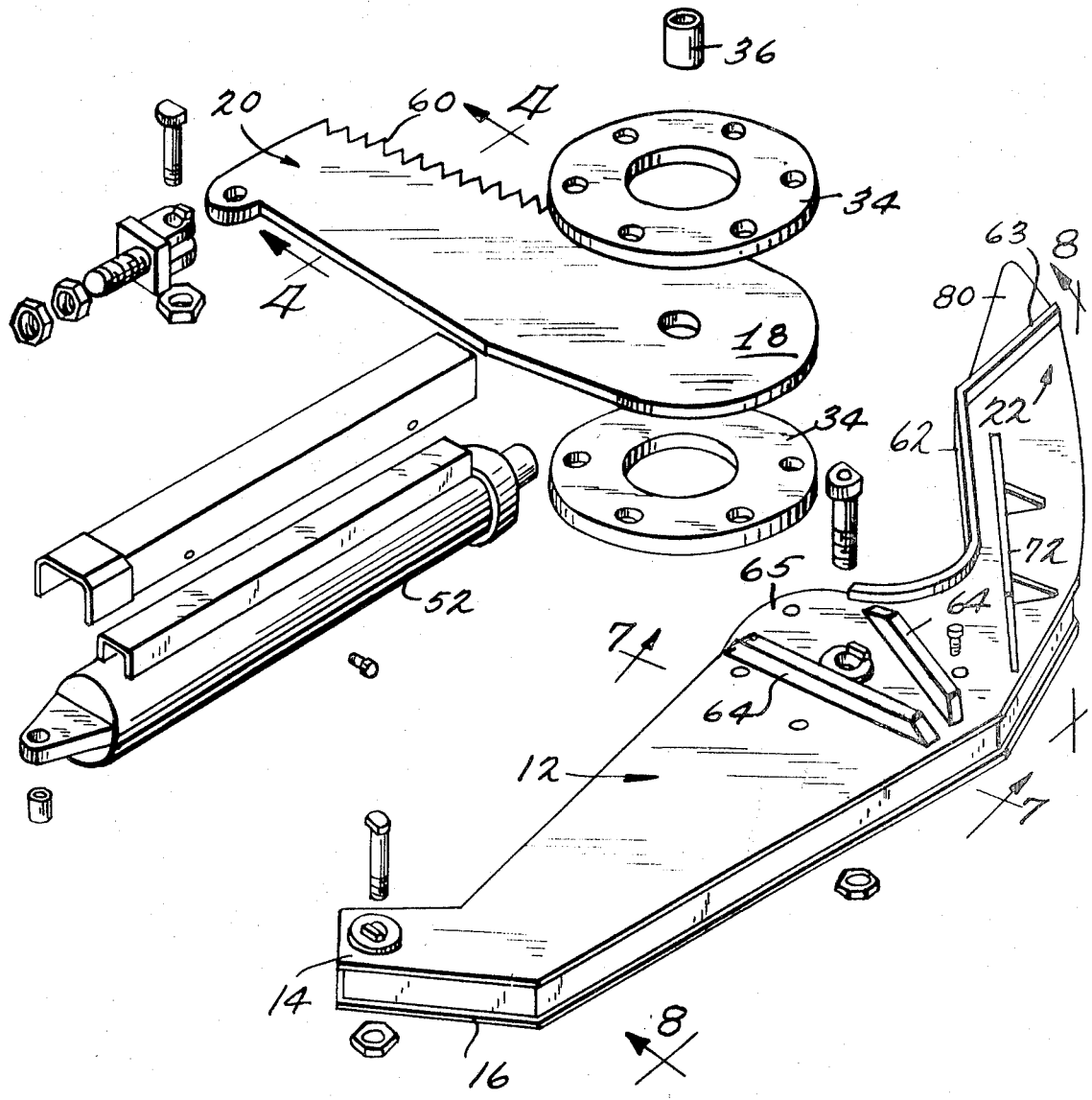
FIG. 5 is an exploded perspective view of a second embodiment of a shear in accordance with this invention showing an improved mounting arrangement for a cutting blade means together with other features which improve the cutting and handling of trees.

Referring to the drawings, two examples of construction are illustrated in FIGS. 1 and 5 and in the remaining figures which are related thereto. FIG. 1 illustrated a shear construction having a cutting blade means which is not serrated on its cutting edge, but a particular configuration and relationship of a shear jaw to the blade assures that a tree is retained in cutting position by the shear once a cutting operation has started. FIG. 5 illustrates a construction of a shear wherein a cutting blade means has a serrated cutting edge, and the serrations on the cutting edge assure a retention of the tree against a jaw of the shear while the tree is being cut.

FIGS. 1–3 illustrate an embodiment of a timber shear which is suitable for cutting large diameter timber (for example timber having a diameter of 18 inches or more) in a single stroke of a cutting blade means. The illustrated example shows a shear having a main body portion identified generally as 12. The main body 12 of the shear may comprise any suitable frame or construction for supporting the cutting blade means of a shear and for defining a jaw member against which a tree is placed while the cutting blade means is advanced through the tree. In the illustrated examples, the main body of the shear is constructed from two plate elements 14 and 16 which are spaced apart from one another so as to define a recess into which a base portion 18 of a cutting blade means 20 can be mounted for pivotal movements about an axis of rotation. Also, the plate members 14 and 16 define an extended jaw portion 22 for the timer shear, and the extended jaw portion functions to cooperate with the cutting movements of the cutting blade means 20 to effect a clean severing of a tree by a single cutting stroke of the cutting blade means 20. The two plate members 14 and 16 may be spaced from one another by welding, or otherwise affixing, wall portions 24 between the two plate members so as to fix their positions relative to one another. Wall portions 24 are provided about all portions of the main body where the shear must be strengthened and where it is desired to fix the positions of the plate members 14 and 16 relative to one another. In the FIG. 1 illustration, the wall portion 24 extends from point 26 on a leg of the main body to a point 28 where the supporting wall is angled across the jaw portion 22 of the shear so as to leave a completely open passageway 30 through the jaw means 22. A reinforcement plate 32 is welded or affixed to the free end of the jaw portion 22 to reinforce the jaw and to maintain the plate members 14 and 16 in a spaced relationship which provides a completely unobstructed passageway 30 through the jaw.

The cutting blade 20 includes an enlarged base portion 18 for supporting the cutting blade means within the main body 12 of the shear. As shown, the enlarged base portion 18 of the cutting blade 20 may have a configuration which is partially circular, and this provides for a firm support of the cutting blade means 20 between a pair of circular bearing plates 34. The cutting blade means 20 is positioned within a recess defined between the plate members 14 and 16 of the main body of the shear, and the cutting blade means 20 carries opening it a bearing sleeve 36 which fits within an opening 38 provides within the base portion of the cutting blade means. The cutting blade means is inserted within the main body of the shear so as to align the opening 38 with smaller openings 40 formed through the plates 14 and 16 of the main body portion of the shear. The openings 38 and 40 define a pivotal axis about which the cutting blade means 20 may be moved back and forth towards and away from the jaw member 22 of the shear. In accordance with one of the improvements of the present invention, a pair of bearing plates 34 are positioned on opposite flat surfaces of the base portion 18 of the cutting blade means so as to fully support the base portion for all positions of movement of the cutting blade means 20. As illustrated, the bearing plate elements 34 are of a disclike construction with large openings 42 provided through the centers of the discs. The outside configurations of the plates 34 are designed to nearly match the outside configuration of the base portion 18 of the cutting blade means so that the entire base portion is supported during its various positions of movement. When the cutting blade means 20 and the bearing plates 34 are in position within the main body 12 of the shear, a threaded bolt 44 is inserted through the openings 40 and 36 to retain all elements in position. The bearing sleeve 36 is held in a firm position by the bolt 44 when threaded nuts 46 are threaded thereon, and the bolt 44 is of a diameter which fits within a bore formed through the bearing sleeve 36. The pair of bearing plates 34 are fixed in their positions within the main body 12 of the shear by threading bolts 48 through openings 50 and into threaded openings 52 formed within the bearing plates. The bolts 48 are of a sufficient length to extend through only one of the body plate member 14 and into one bearing plate member 34, and the bottom body plate 16 is provided with openings 50 similar to those shown for the top plate 14 in FIG. 1. When the cutting blade means and its associated elements are in place, the cutting blade can be moved back and forth about a pivotal axis which passes through the central longitudinal axis of the installed bolt 44. As is well known in timber shear devices of this type, hydraulic cylinder means 52 may be used to move the cutting blade means 20 back and forth about its pivotal axis. The hydraulic cylinder 52 comprises a double-acting hydraulic cylinder which is actuated by fluid pressure from any suitable source with known control devices. A connecting arm of the piston carried within the hydraulic cylinder 52 is connected to the cutting blade means at 54, and an opposite end of the hydraulic cylinder 52 is connected to the main body of the shear at 56. Bolts, pins, or other suitable fastening devices may be utilized for connecting the hydraulic cylinder 52 between the cutting blade means 20 and the main body of the shear. FIG. 1 also illustrate a removable shroud 58 which functions to protect hydraulic hoses running to opposite ends of a piston carried within the hydraulic cylinder 52. With all elements assembled, and with the hydraulic cylinder 52 connected to pressure sources, the cutting blade means 20 can be actuated towards the jaw 22 to effect a severing of a tree from its stump. The hydraulic cylinder 52 may operated at a hydraulic pressure within the range of 2,000–3,000 p.s.i., or at whatever pressure is required to force a cutting blade through a tree. Also, timber shears of this type can be tilted into upright positions to cut trees into long segments once a tree is in a horizontal position on the ground.

FIG. 3 shows a top plan view of the timber shear illustrated in FIG. 1, and FIG. 3 illustrates a preferred relationship of the cutting blade means 20 to the jaw 22 of the timber shear. As previously noted, the cutting blade means 20 is pivotally mounted so as to be movable towards and away from the jaw 22, and the pivotal mounting point of the cutting blade means 20 is shown at A in FIG. 3. Thus, when the hydraulic cylinder 52 is actuated to extend its connecting rod outwardly from the cylinder, the cutting blade means 20 is advanced towards the jaw 22. The cutting blade means 20 includes a cutting edge 60 which may be either serrated or nonserrated as illustrated. A cross-sectional configuration of the cutting blade means (either serrated or nonserrated) is shown in FIG. 4 (which is reversed for the blade position illustrated in FIG. 3). In the example of a shear shown in FIG. 3, the line $x$ indicates the widest diameter of a tree which can be received between the cutting edge 60 of the blade and the jaw 22. The jaw 22 is positioned so that a tangent drawn on its point to contact $y$ with the widest diameter of a tree is substantially parallel with the cutting edge 60 of the cutting blade means. Also, the jaw 22, and the tangent of its point $y$, are offset from the pivotal point A of the cutting blade means 20 so that no reaction forces tend to force the shear away from the tree while the tree is being cut. With the relationships which have been just described, it can be seen that any cutting movement of the cutting blade means 20 (from the position shown in FIG. 3) towards the jaw 22 will not tend to squeeze the shear away from the tree, but rather, will tend to embrace the tree beyond its maximum diameter line $x$ so as to retain the tree fully within the confines of the shear while it is being cut. Once the cutting blade means 20 has been advanced to its maximum position relative to the jaw 22, the outer end of the cutting edge 60 is received within the hollow jaw 22, and the tree is completely severed. After severing the tree, the blade means 20 is withdrawn to the position shown in the FIG. 3 for a subsequent cutting operation.

FIG. 5 illustrates a second example of a timber shear construction which includes the improvements of the present invention. The particular configuration and arrangement shown in FIG. 5 is useful for large shears having capabilities of handling very large diameter timber (for example, 24 inches or larger), including hardwood. The basic arrangement of a main body 12, a jaw 22, and a cutting blade means 20 mounted with a pair of bearing plate elements 34 is substantially the same as that described for the FIG. 1 example. The cutting blade means 20 is operated by a hydraulic cylinder means 52 is a well-known manner, and the main body portion of the shear may be assembled from two plates 14 and 16 having the configuration shown. In the FIG. 5 example, the jaw portion 22 of the shear is provided with an anvil 62 against which the cutting edge 60 of the cutting blade means 20 moves when a cutting operation is taking place. The anvil 62 consists of a metal plate member which is welded, or otherwise affixed, to the tree-contacting portion of the jaw 22, and the anvil 62 may extend around the terminal end of the shear to provide a reinforced end portion 63. Alternatively, the jaw 22 could be provided with a completely unobstructed passageway to permit the passage of chips, bark, and other debris as described for the FIG. 1 embodiment, but the use of an anvil is desirable for very large trees. The cutting blade means 20 of the FIG. 5 embodiment is mounted for rotation about a pivotal axis, as described for the FIG. 1 arrangement, and the pivotal axis is offset from the portion of the anvil 62 which forms a substantial tangent with a line drawn through the maximum diameter of a tree to a point of contact with the cutting blade means 20. This arrangement has already been discussed with reference to FIG. 1. The larger timber shear of FIG. 5 may also include reinforcement member 64 to strengthen the portion of the main body which receives the base end 18 of the cutting blade means 20, and the main body of the shear may be shaped at 65 to match the circular configurations of the bearing plates 34 and the cutting blade means 20.

FIG. 6 illustrates a construction for individual teeth which may be provided on the cutting blade means 20 of the FIG. 5 example. Although the example shown in FIG. 5 may utilize a nonserrated cutting edge 60, it is preferred to add a plurality of teeth of special configuration where very large or hard trees are to be cut. The individual teeth of a plurality of teeth formed on the cutting blade means 20 are shown in detail in the plan view of FIG. 6. Each tooth 66 is shaped to include a leading edge 68 and a trailing edge 70. The leading edge of each tooth functions as a cutting edge, and the trailing edge 70 is a noncutting edge. The leading and trailing edges of the teeth intersect to form points of the teeth, and the points of the teeth are advanced through the tree on an arc which retains the tree in firm engagement with the main body of the timber shear. As illustrated in FIG. 6, each trailing edge of each tooth 66 is formed by a circle segment having a radius from the pivotal mounting point A of the cutting blade means 20. Each leading edge 68 of each tooth is formed on a radius taken from a point B which is offset from the pivotal mounting axis of the cutting blade means 20. Thus, the cutting blade means 20 moves about its pivotal axis A to advance cutting edges 68 into a tree in a direction which retains the tree against the timber shear so that no reaction forces are set up against the shear or against a vehicle upon which it is mounted. If it is necessary to retract the cutting blade means 20 after partial cut through a very large tree, the trailing edges 70 follow return paths which have already been opened by an advancing cutting movement, and therefore, there is little or no binding of the cutting blade means within a little or not binding of the cutting blade means within a partially severed tree if it is necessary to retract the cutting blade means from the tree.

FIGS. 7 and 8 illustrate details of a tree handling and pushing member 72 which may be affixed to any timber shear which cuts a tree by an advancement of a cutting blade means through the tree. The member 72 is intended to assist in the safe handling of a tree during and after the time that is has been cut from its stump, and the member 72 is intended to function when the timber shear is in a substantially horizontal plane as shown in FIGS. 7 and 8. The handling and pushing member 72 comprises a plate or other equivalent construction having a vertical pushing surface 74, and a substantially horizontal surface 76. The vertical pushing surface 74 functions to bear against a tree which has been cut and which is lying in a substantially horizontal plane as shown in FIG. 8. Once the tree has fallen, it is possible for an operator to push the butt end of the tree to a preferred location away from its stump with the upright surface 74 of the member 72. The substantially horizontal surface 76 is illustrated as being inclined so that a tree which has fallen completely to the ground may be picked up by an advance movement of the entire timber shear under the position of the tree. Also, the substantially horizontal surface 76 functions as a fulcrum about which the tree may fall while it is being cut, and this provides for a safe felling of the tree and for a lifting of the butt end of the tree away from the ground, as shown in FIG. 7.

With the shear constructions shown for this invention, a tree falls in a predictable path which is substantially perpendicular to the cutting edge 60 of the cutting blades 20, and the direction of fall is in the direction of cutting movement of the cutting blade means 20 towards the jaw 22. By positioning the handling and pushing element 72 adjacent to the tree-engaging portions of the jaw 22, a tree is dropped in a direction which goes over the horizontal surface 76 of the member 72, and this relationship is shown in FIGS. 7 and 8.

The improved shears of this invention may also be provided with an element 80 which functions to lift logs upwardly into the tree-engaging portions of the shear when the shear is being used in a vertical attitude for cutting up logs that are already lying in horizontal positions. When the tree is in a vertical attitude, it is possible to force the inclined element 80 into the earth underneath a tree so as to pick a tree upwardly and onto the jaw 22. This permits a universal use of the timber shear for cutting fallen timber as well as for cutting standing timber in a forest.

Having described the constructional features of this invention, it can be seen that timber shears are provided with improvements which result in more efficient and safer cutting of trees and which provide for a longer life of the shear. The improved mounting arrangement for carrying a cutting blade means solely between a pair of bearing plate elements eliminates a requirement for careful positioning of additional bearing plates throughout the main body of the shear for supporting the blade, and the use of essentially circular bearing plates 34 permits a periodic rotation of the bearing plates to compensate for any wear that may take place from the pivotal movements of the cutting blade means 20. The bearing plates can be adjusted in their positions by simply removing their respective mounting bolts 48 and rotating each individual bearing plate by a desired amount to present a new wear surface for the cutting blade means 20. If an extreme wear pattern develops, the individual bearing plates can be turned over or they can be easily replaced, as desired. As discussed above, the shear is constructed to eliminate reaction forces when the cutting blade means 20 is advancing through a tree, and this means that there is no tendency for the shear to be pushed away from a tree while a cutting action is taking place. By eliminating reaction forces, it is not necessary for vehicles to be provided with special braking or locking devices, and more efficient cutting can be effected at a more rapid rate than has been possible with constructions which tend to squeeze a tree out of the grasp of a timber shear jaw and its cutting blade. It can be appreciated that the timber shears discussed above are by way of example only, and equivalent structures can be designed to provide the same functions which are set forth for this invention. It is intended that substitutions of equivalent

What is claimed is:

1. In a timber shear having a main body means which can be connected to and carried by a vehicle, and a cutting blade means which has a base portion pivotally mounted relative to the main body so that a cutting portion of the blade means is operable about a pivotal axis passing through a central portion of the main body, the improvement comprising:
   a pair of relatively large bearing plate means positioned to contact opposite flat surfaces of the base portion of the cutting blade means so as to surround the pivotal axis of the cutting blade means, whereby the cutting blade means is fully supported and reinforced within the main body means of the shear without a requirement for additional bearing plate elements in said main body means.

2. The improved shear of claim 1 wherein said bearing plate means have substantially circular perimeters which are of a similar configuration to the configuration of the base portion of said cutting blade means.

3. The improved shear of claim 1 wherein said pair of bearing plates each have openings through their centers and wherein said bearing plates are adjustable mounted about the pivotal axis of the cutting blade means so that the bearing plates can be rotated to compensate for wear.

4. The improvement of claim 1 wherein said main body means comprises a pair of plate members which are spaced apart from one another so as to receive said bearing plates and said base portion of said cutting blade means therebetween, said pair of plate members further having a configuration which defines a jaw means against which a tree can be received while it is being cut by the cutting blade means.

5. The improvement of claim 4 wherein said jaw means includes an anvil member mounted between said spaced plate members for receiving a cutting edge of said cutting blade means.

6. The improvement of claim 4 wherein said jaw means includes a completely open area between said spaced plate members and extending completely through said main body means for receiving a cutting edge of said cutting blade means and for allowing a free passage of any chips, bark or other debris through the jaw means.

7. The improvement of claim 1 wherein the cutting blade means is mounted for pivotal movement about a pivotal axis which is positioned on the base portion of the cutting blade means at a point offset from tree contacting portions of said jaw means so that the shear is retained in working engagement with a tree during the entire operation of cutting a tree.

8. The improvement of claim 7 wherein the jaw means is shaped to retain a tree within the confines of the main body means while a tree is being cut.

9. The improvement of claim 7 wherein the cutting edge of said cutting blade means includes a plurality of teeth having leading and trailing edges which terminate in points to define separate teeth of the plurality.

10. The improvement of claim 9 wherein each leading edge of each tooth is a cutting edge and wherein each trailing edge is a noncutting edge.

11. The improvement of claim 10 wherein each trailing edge of each tooth is formed on a curve having a radius originating with the pivotal axis of the cutting blade means.

12. In a timber shear having a main body means which can be connected to and carried by a vehicle, and a cutting blade means pivotally mounted relative to the main body so that the cutting portion of the blade means is operable about a pivotal axis passing through a central portion of the main body, the improvement comprising:
   a cutting blade means having a base portion and a cutting edge portion, said base portion being mounted within the main body means of the shear so as to be supported for pivotal movement relative to said main body means, said pivotal movement of the cutting blade means being about an axis which is offset in advance of a tree contacting portion of a jaw member carried by the main body means of the shear, so that a tree is held against the jaw portion of the main body means while the cutting blade means is moved in a shearing direction about its pivotal axis by a power operated means, and
   a plurality of teeth on the cutting edge of the cutting blade means to further retain a tree while it is being cut, each tooth of said cutting blade means having a leading edge which is a cutting edge and a trailing edge which intersects with the leading edge to form a point directed to retain the shear against a tree while the tree is being cut, said trailing edge of each tooth being a noncutting edge formed on a curve having a radius originating at the point of the pivotal axis of the cutting blade means.

13. The improvement of claim 12 wherein said cutting blade means is mounted for pivotal movement relative to said maid body means between a pair of flat bearing plates which form the sole bearing support for the cutting blade means for all positions of movement.

14. The improvement of claim 12 wherein the main body means of the shear is made up of a pair of spaced plate members which functions (a) to carry the pivotal cutting blade means and (b) to define a jaw portion against which a tree is retained while it is being cut by the cutting blade means.

15. The improvement of claim 14 wherein the jaw portion of the shear includes an anvil against which the cutting blade means can operate during a cutting movement of the blade.

16. The improvement of claim 14 wherein the jaw portion of the shear includes a completely open area therethrough for allowing a free passage of chips, bark and other debris through the jaw portion.

17. In a timber shear having a main body means which can be connected to and carried by a vehicle, and a cutting blade means which has a base portion pivotally mounted relative to the main body so that a cutting portion of the blade means is operable about a pivotal axis passing through a central portion of the main body, the improvement comprising:
   a pair of relatively large bearing plates positioned to contact opposite flat surfaces of the base portion of the cutting blade means so as to surround the pivotal axis of the cutting blade means, said bearing plates having substantially circular perimeters which are of a similar configuration to the configuration of the base portion of said cutting blade means, whereby the cutting blade means is fully supported and reinforced within the main body means of the shear without a requirement for additional bearing plate elements in said main body means, and including on said main body means a tree pushing and handling element which extends outwardly from the jaw portion in a direction which is at approximate right angles to the cutting plate of the cutting blade means and along the line which is at approximate right angles to the direction in which a tree is intended to fall, said tree pushing and handling element having an upright portion positioned adjacent and slightly behind a tree that is being cut so that the tree can be pushed after it is cut and has fallen to the ground.

18. In a timber shear of the type which can be mounted on a vehicle and which has a pivotally mounted cutting blade means which can be operated to cut through a tree and towards a jaw portion of the shear, the improvement comprising:
   a tree pushing and handling element which is mounted on said shear along said jaw portion so as to be vertically upright when the cutting blade means is operating in a horizontal plane of movement, said tree pushing and handling element having (a) an upright edge for pushing trees when the shear is pushed by a vehicle and (b) a substantially horizontal surface which functions as a fulcrum over which a tree may fall as it is being severed from its stump.

19. In a timber shear having a main body portion which can be connected to and carried by a vehicle, and a cutting blade means pivotally mounted relative to the main body so that a cutting portion of the blade means is operable about a fixed pivotal axis passing through a central portion of the main body, the improvement comprising:

a cutting blade means having a base portion and a cutting edge portion, said base portion being mounted within the main body of the shear so as to be supported for pivotal movement relative to the main body, and a plurality of teeth on the cutting edge portion of the cutting blade means, a fixed jaw member carried by the main body of the shear to provide a bearing surface towards which the cutting blade means can move during a tree-cutting operation, and said cutting blade means being positioned so that when opened to its most open position to receive the largest diameter tree acceptable to the shear, the cutting edge portion of the blade means makes a first point of contact with said tree at a tangent which forms a parallel with, or a small inwardly directed acute angle with, a tangent formed by initial contact of the jaw member with the tree, said parallel or small acute angle being such that pivotal movement of the cutting blade towards the jaw member maintains the tree within the confines of the shear without developing any reaction forces which would force the tree away from the shear.

20. The improvement of claim 19 wherein each tooth on said cutting blade means has a leading edge which intersects with a trailing edge to form a point which is directed to retain against a tree while the tree is being cut.

21. In a timber shear having a main body portion which can be connected to and carried by a vehicle, and a cutting blade means pivotally mounted relative to the main body so that a cutting portion of the blade means is operable about a fixed pivotal axis passing through a central portion of the main body, the improvement comprising:

a cutting blade means having a base portion and a cutting edge portion, said base portion being mounted within the main body of the shear so as to be supported for pivotal movement relative to the main body, and a plurality of teeth on the cutting edge portion of the cutting blade means, with each tooth of said cutting blade means having a leading edge which is a cutting edge and a trailing edge which is a noncutting edge, said leading and trailing edges of each tooth intersecting to form a point directed to retain the shear against a tree while the tree is being cut, and said trailing edge of each tooth being formed on a curve having a radius originating at the point of the pivotal axis of the cutting blade means, a fixed jaw member carried by the main body of the shear to provide a bearing surface towards which the cutting blade means can move during a tree-cutting operation, and said cutting blade means being positioned so that when opened to receive the largest diameter tree acceptable to the shear, the cutting edge portion of the blade means initially contacts said tree at a tangent which forms a parallel with, or a small inwardly directed acute angle with, a tangent formed by initial contact of the jaw member with the tree, said parallel or small acute angle being such that pivotal movement of the cutting blade towards the jaw member maintains the tree within the confines of the shear without developing any reaction forces which would force the tree away from the shear.

* * * * *